(12) United States Patent
Liu

(10) Patent No.: US 11,460,318 B2
(45) Date of Patent: Oct. 4, 2022

(54) METHOD AND APPARATUS FOR RECONSTRUCTING MOTION TRACK, STORAGE MEDIUM, AND ELECTRONIC DEVICE

(71) Applicant: TENCENT TECHNOLOGY (SHENZHEN) COMPANY LTD, Guangdong (CN)

(72) Inventor: Chun Liu, Shenzen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 130 days.

(21) Appl. No.: 17/036,665

(22) Filed: Sep. 29, 2020

(65) Prior Publication Data

US 2021/0156713 A1 May 27, 2021

Related U.S. Application Data

(63) Continuation of application No. PCT/CN2019/094813, filed on Jul. 5, 2019.

(30) Foreign Application Priority Data

Aug. 6, 2018 (CN) .......................... 201810886856.1

(51) Int. Cl.
*G01C 21/00* (2006.01)
*B60W 60/00* (2020.01)
*B60W 30/045* (2012.01)

(52) U.S. Cl.
CPC ....... *G01C 21/3848* (2020.08); *B60W 60/001* (2020.02); *B60W 2520/105* (2013.01)

(58) Field of Classification Search
CPC ..... B60W 60/001; G08G 1/01; G06V 10/987; A01D 34/008; B60L 15/40; B60T 8/1755; G01C 21/00
See application file for complete search history.

(56) References Cited

U.S. PATENT DOCUMENTS

2015/0125028 A1\* 5/2015 Liao ..................... G06V 10/987
382/103
2020/0317221 A1\* 10/2020 Muto ....................... G08G 1/01

FOREIGN PATENT DOCUMENTS

| CN | 102998684 A | 3/2013 |
|---|---|---|
| CN | 103809195 A | 5/2014 |

(Continued)

OTHER PUBLICATIONS

Written Opinion of the International Searching Authority dated Oct. 22, 2019 in International Application No. PCT/CN2019/094813.
(Continued)

*Primary Examiner* — Yuri Kan
(74) *Attorney, Agent, or Firm* — Sughrue Mion, PLLC

(57) ABSTRACT

A method for reconstructing a motion track applied to a terminal is provided. The method includes: obtaining a data set, the data set including positioning data obtained by positioning a target object; performing data fitting on target data in the data set to obtain a plurality of segments of first curves, the target data being positioning data obtained by performing noise filtering on the data set; and determining a motion track of the target object based on the plurality of segments of first curves. Counterpart apparatus and non-transitory computer-readable storage medium embodiments are also contemplated.

20 Claims, 8 Drawing Sheets

(56) References Cited

FOREIGN PATENT DOCUMENTS

| CN | 104215249 | A |   | 12/2014 |            |
|----|-----------|---|---|---------|------------|
| CN | 106558219 | A |   | 4/2017  |            |
| CN | 107544080 | A |   | 1/2018  |            |
| CN | 108268960 | A |   | 7/2018  |            |
| EP | 3 009 990 | A1 |  | 4/2016  |            |
| GB | 2526806   | A |   | 12/2015 |            |
| JP | 2005084024 | A | * | 3/2005 | ............. G01C 21/00 |
| JP | 2015120412 | A | * | 7/2015 | ............. B60T 8/1755 |
| JP | 6215032   | B2 | * | 10/2017 | ............. B60L 15/40 |
| JP | 2018007402 | A | * | 1/2018 | ............. B60L 15/40 |
| WO | 2007/010317 | A1 |  | 1/2007 |            |
| WO | WO-2018108180 | A1 | * | 6/2018 | ........... A01D 34/008 |

OTHER PUBLICATIONS

Wolfgang Konle, "Track Data Smoothing for Air Traffic Simulation", 41. Jahrestagung der Gesellschaft für Infomiatik, 2011, Retrieved from: URL: <http://www.user.tu-berlin.de/komm/CD/paper/100159.pdf> (14 pages total).

Rahul Vishen et al., "GPS Data Interpolation: Bezier vs. Biarcs for Tracing Vehicle Trajectory", Springer International Publishing Switzerland, 2015, vol. 9156, pp. 197-208, Retrieved from: URL: <http://dx.doi.org/10.1007/978-3-319-21407-8_15> (12 pages total).

Extended European Search Report dated Sep. 8, 2021 in European Application No. 19848288.7.

Clement Dupont et al., "On image segmentation methods applied to glioblastoma: state of art and new trends", HAL archives ouvertes.fe, HAL Id:hal-01325355, 20 pages.

Ding Shaowei, "Research on Osteosarcoma Medical Image Analysis System", A Thesis in Biomedical Engineering, Jan. 2013, 76 pages.

Wang, Nan et al., "Real Time Extraction and Description for Vehicle Trace Curves", Journal of Northeastern University (Natural Science), Apr. 30, 1999, pp. 111-113, vol. 20, No. 2.

International Search report for PCT/CN2019/094813, dated Oct. 22, 2019.

* cited by examiner

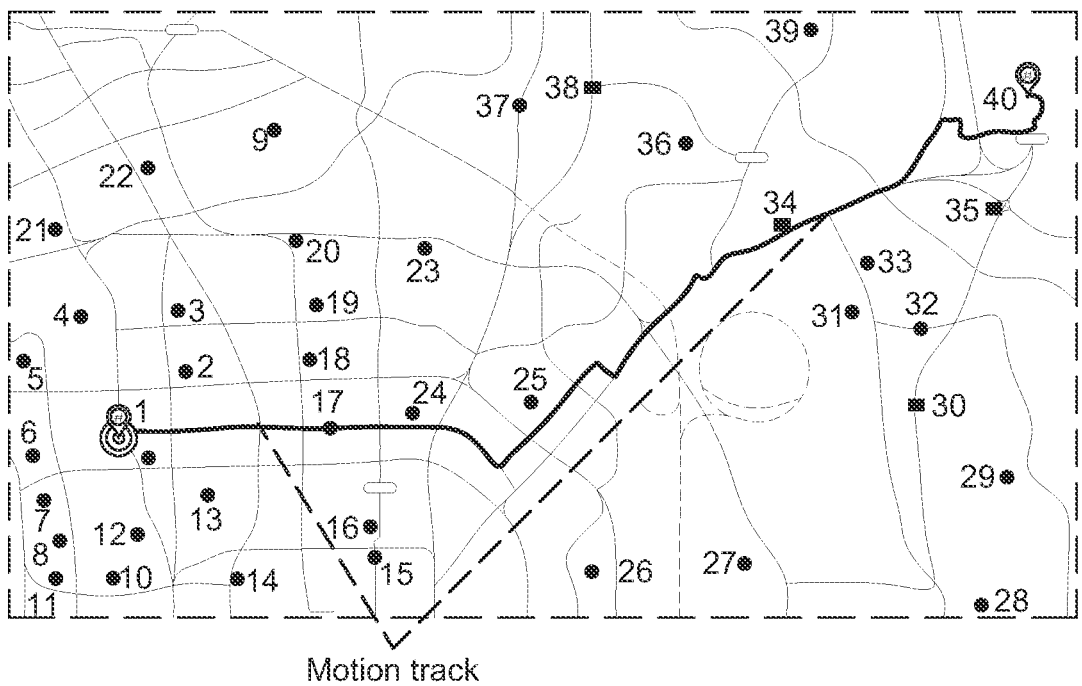

1. Starting Location
2. Destination
3. Beijing Information University of Science and Technology
4. Beijing Sports University
5. DongXiaoKo Forest Park
6. Eastern Star Driving Range
7. Star Equestrian Club
8. Beijing New International Exhibition Center
9. Olympics Forest Park
10. Beijing Conference Center
11. Tsinghua University
12. China University of Agriculture
13. China Science and Technology Building
14. Beijing University of Science and Technology
15. Beijing Olympics Park
16. Peking University
17. University of Economics and Business
18. MuDan Garden
19. YuanDa City Old Location
20. Central University of Arts
21. Five Start Bridge
22. BayGua Station
23. ShiLan Bridge
24. TsengTao Bridge
25. Beijing International Raceway Park
26. Beijing Tulip Resorts
27. Beijing Youth University of Politics
28. Manor of Lavender
29. ChaoYang Sports Center
30. Beijing 798 Art Area

FIG. 8

31. HanYang Park
32. DiLan Park
33. Beijing Normal University
34. Beijing University of Science and Engineering
35. JiaoTong University
36. Central Clan University
37. Beijing Zoo
38. TsingCheKao
39. DongCheMeng
40. YongHeFo

FIG. 8(Continued)

METHOD AND APPARATUS FOR RECONSTRUCTING MOTION TRACK, STORAGE MEDIUM, AND ELECTRONIC DEVICE

CROSS-REFERENCE TO RELATED APPLICATION(S)

This application is a bypass continuation application of International Application No. PCT/CN2019/094813, filed Jul. 5, 2019, which claims priority to Chinese Patent Application No. 201810886856.1, filed with the China National Intellectual Property Administration on Aug. 6, 2018 and entitled "METHOD AND APPARATUS FOR RECONSTRUCTING MOTION TRACK, STORAGE MEDIUM, AND ELECTRONIC DEVICE", the disclosures of which are herein incorporated by reference in their entireties.

FIELD

The disclosure relates to the field of an electronic map, and specifically, to a method and an apparatus for reconstructing a motion track, a storage medium, and an electronic device.

BACKGROUND

With the increase of vehicles and travel demands, users are increasingly dependent on in-vehicle navigation. The accuracy of navigation and positioning are the most important factor in selecting an in-vehicle navigation device.

A vehicle positioning system in the related art generally relies on global positioning system (GPS) signals or network signals. A positioning module of the vehicle positioning system can obtain positioning results merely through GPS signals or network signals. However, when the vehicle travels to a location without GPS signals or network signals such as a tunnel or an underground garage, the vehicle cannot acquire positioning data through the GPS or network, and therefore cannot implement accurate positioning, and can only estimate a positioning track based on the speed of the vehicle.

Therefore, the related art vehicle monitoring system has two technical deficiencies. On one hand, when a moving vehicle enters an area where a vehicle positioning signal is weak or there is no vehicle positioning signal, the moving vehicle is in a "temporary lost" state, and accurate positioning of the moving vehicle cannot be performed because the accurate vehicle positioning signal cannot be obtained. On the other hand, due to the relatively poor positioning accuracy of a positioning chip used by an in-vehicle navigation terminal, a vehicle monitoring center inevitably receives drifting positioning data (that is, the vehicle location data, the current position of the vehicle indicated by which is offset from the actual position of the vehicle), which eventually leads to an offset of a vehicle driving curve on a monitoring interface of a vehicle travelling track monitoring system from the actual vehicle travelling track. Consequently, a vehicle driver is misled and the navigation experience of a user is reduced.

For the foregoing problems, no effective solutions have been provided.

SUMMARY

One or more embodiments of the disclosure provide a method and an apparatus for reconstructing a motion track, a storage medium, and an electronic device, to solve at least the technical problem of relatively low accuracy of vehicle motion track reconstruction in the related art.

According to an aspect of an example embodiment, a method for reconstructing a motion track is provided, including: obtaining a data set, the data set including positioning data obtained by positioning a target object; performing data fitting on target data in the data set to obtain a plurality of segments of first curves, the target data being positioning data obtained by performing noise filtering on the data set; and determining a motion track of the target object based on the plurality of segments of first curves.

According to an aspect of an example embodiment, an apparatus for reconstructing a motion track is provided, including: at least one memory configured to store program code; and at least one processor configured to read the program code and operate as instructed by the program code, the program code including: first obtaining code configured to cause at least one of the at least one processor to obtain a data set, the data set including positioning data obtained by positioning a target object in a moving process of the target object; fitting code configured to cause at least one of the at least one processor to perform data fitting on target data in the data set to obtain a plurality of segments of first curves, the target data being positioning data obtained by performing noise filtering on the data set; and first determining code configured to cause at least one of the at least one processor to determine a motion track of the target object based on the plurality of segments of first curves.

According to an aspect of an example embodiment, a non-transitory computer-readable storage medium is provided, including a computer program stored therein, the computer program, when executed by at least one processor, causing the at least one processor to perform: obtaining a data set, the data set including positioning data obtained by positioning a target object; performing data fitting on target data in the data set to obtain a plurality of segments of first curves, the target data being positioning data obtained by performing noise filtering on the data set; and determining a motion track of the target object based on the plurality of segments of first curves.

According to an aspect of an example embodiment, an electronic device is provided, including at least one memory, at least one processor, and a computer program that is stored in the at least one memory and executable by the at least one processor to cause at least one of the at least one processor to perform: obtaining a data set, the data set including positioning data obtained by positioning a target object; performing data fitting on target data in the data set to obtain a plurality of segments of first curves, the target data being positioning data obtained by performing noise filtering on the data set; and determining a motion track of the target object based on the plurality of segments of first curves.

BRIEF DESCRIPTION OF THE DRAWINGS

The accompanying drawings described herein are used for providing further understanding of the disclosure, and form a part of the disclosure. Exemplary embodiments of the disclosure and descriptions thereof are used to explain the disclosure, and do not constitute any inappropriate limitation to the disclosure. In the accompanying drawings:

FIG. 8 is a schematic diagram of an optional map reconstruction track curve according to an embodiment of the disclosure.

DETAILED DESCRIPTION

To make a person skilled in the art better understand solutions of the disclosure, the following clearly and completely describes the technical solutions in the embodiments of the disclosure with reference to the accompanying drawings in the embodiments of the disclosure. The described embodiments are merely some rather than all of the embodiments of the disclosure. All other embodiments that can be obtained by a person skilled in the art based on the embodiments of the disclosure without creative efforts shall fall within the protection scope of the disclosure.

The terms such as "first" and "second" in the specification, the claims and the accompanying drawings of the disclosure are intended to distinguish between objects, but are not necessarily used for describing a specific sequence or a precedence level. It should be understood that elements that are termed "first" and "second" are interchangeable in proper circumstances and the embodiments of the disclosure described herein may be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but can include other steps or units not expressly listed or inherent to such a process, method, product, or device.

First, some nouns or terms that appear during descriptions of the embodiments of the disclosure are applicable to the following explanations:

Autonomous vehicle: also referred to as a driverless vehicle, a computer driven vehicle, or a wheeled mobile robot, is a type of intelligent vehicle that may realize driverless driving by using a computer system.

Kalman filtering: an algorithm that uses a linear system state equation to optimally estimate the system state based on input and output observation data of the system. The observation data includes impact of noise and interference in the system, and therefore, the optimal estimation may also be regarded as a filtering process.

According to an aspect of an embodiment of the disclosure, a method embodiment of a method for reconstructing the motion track is provided.

Figure 1:
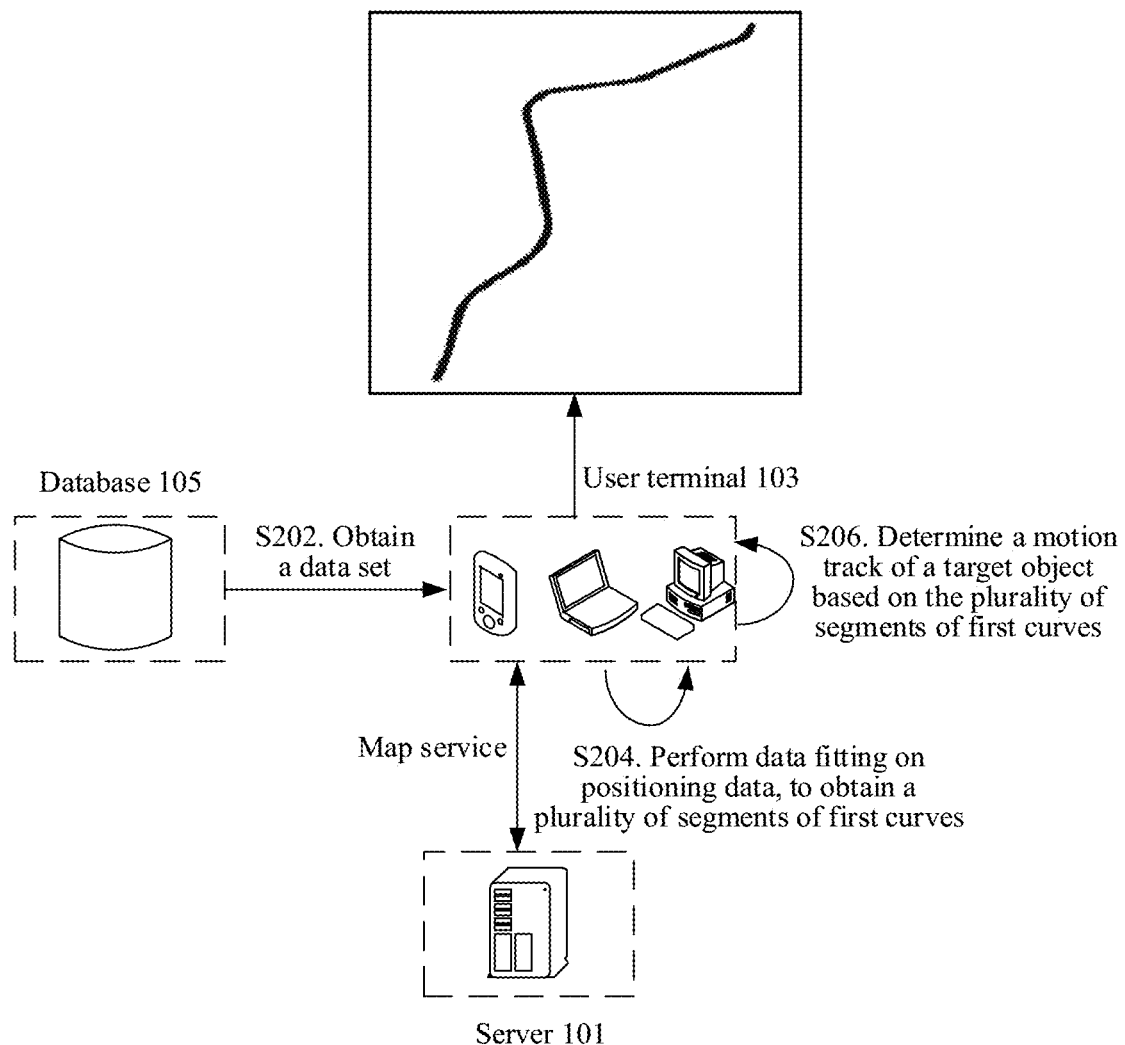
FIG. 1 is a schematic diagram of a hardware environment of a method for reconstructing a motion track according to an embodiment of the disclosure.

Optionally, in an embodiment, the foregoing method for reconstructing a motion track may be applied to a hardware environment in FIG. 1, including a server 101 and/or a terminal 103. As shown in FIG. 1, the server 101, connected to the terminal 103 through a network, may be configured to provide a service (such as a game service, an application service, a map service or an automatic drive service) for the terminal or a client installed on the terminal. A database 105 may be provided on the server or independently of the server, and used for providing a data storage service for the server 101. The foregoing network includes, but is not limited to, a wide area network, a metropolitan area network, or a local area network, and the terminal 103 is not limited to a PC, a mobile phone, a tablet computer, or the like.

Figure 2:
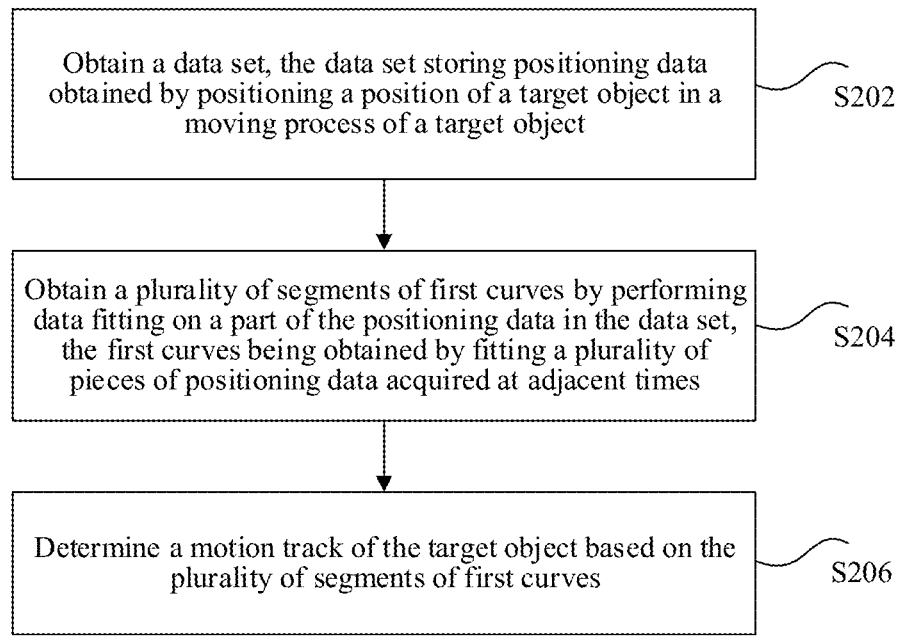
FIG. 2 is a flowchart of an optional method for reconstructing a motion track according to an embodiment of the disclosure.

The method for reconstructing a motion track of an embodiment of the disclosure may be performed by the terminal 103. FIG. 2 is a flowchart of an optional method for reconstructing a motion track according to an embodiment of the disclosure. As shown in FIG. 2, the method may include the following operations S202, S204, S206:

Operation S202. The terminal obtains a data set, the data set including positioning data obtained by positioning a position of a target object in a moving process of the target object (e.g., by positioning a target object that is movable).

The foregoing terminal is an intelligent terminal that follows (or tracks) the target object, and the target object may be a movable object such as a vehicle, a person, an airplane, and the like. For ease of description, the following description is provided by using an example in which the target object is a vehicle and the intelligent terminal is an in-vehicle terminal.

The elements stored in the data set are the positioning data, such as positioning data of a global positioning system (GPS) and inertial guidance data that are obtained by positioning a vehicle. For example, in a process of driving a vehicle, a position of the vehicle may be positioned in a manner of timing (such as every other second), that is, positioning data of a plurality of points on a motion track of the vehicle may be acquired without the need to continuously position the vehicle. For example, the position of the vehicle may be obtained in a certain unit of time (e.g., in a certain time interval such as every other second). Accordingly, energy efficiency of a positioning device (e.g., a GPS) is improved and the hardware consumption of the in-vehicle device in the positioning process is reduced.

Operation S204. The terminal performs data fitting on a part of the positioning data in the data set to obtain a plurality of segments of first curves, the first curves being obtained by fitting a plurality of pieces of positioning data acquired at adjacent times, and a proportion of noise data in another part of the positioning data of the data set being higher than that of noise data in the part of the positioning data of the data set.

When the plurality of segments of first curves are obtained by performing data fitting on a part of the positioning data in the data set, the positioning data including no noise data or relatively less noise data is used, and the data may also be referred to as target data. The target data is the positioning data obtained by merely filtering noise from the data set, which is equivalent to filtering the positioning data in the data set before track reconstruction is performed. The target data is obtained to filter out the positioning data (that is, another part of data) that is the noise data, and identify and use the data (that is, the part of the positioning data) that is more accurate. The another part of the data includes a substantial portion of the noise data, and the part of the positioning data includes no or little noise data. In an embodiment, the proportion (e.g., 100% or close to 100%) of the noise data in the another part of the data is much greater than the proportion (e.g., 0% or close to 0%) of the noise data in the part of the positioning data. That is, the technical solution of the disclosure is to reconstruct the motion track of the target object in segments based on filtering so that the impact of GPS noise and data loss may be greatly reduced, an error between the restored track and the actual travelling data may reach a desired level (e.g., industrial-level quality), the data is adaptively segmented and the volume of to-be-processed data is effectively reduced.

During an implementation, the terminal may separately determine whether the positioning data in the data set is the noise data. It is to be understood that some attributes, such as a frequency spectrum, of noise data and non-noise data are different. Accordingly, whether the positioning data is noise data may be determined by identifying attributes such as the frequency spectrum of the positioning data. For any positioning data in the data set, when it is determined that the positioning data is the noise data, the noise data is filtered out from the data set. The remaining positioning data in the data set may be used as the target data. The curve fitting refers to using a continuous curve to approximately depict or simulate a functional relationship between coordinates (that is, points indicated by the positioning data) represented by a group of discrete points on a plane, and is a method for approximating discrete data with an analytical expression. A colloquial expression of the curve fitting is to "pull the curve", that is, a representation method in which the existing data is substituted into a math equation through a mathematical method. For example, several pieces of discrete positioning data are obtained by methods such as sampling and experiment. According to the positioning data, a continuous function (that is, the curve) or a more dense discrete equation is found, so that the positioning data and a curve of the equation can be coincided to the greatest extent.

Operation S206. The terminal determines the motion track of the target object based on the multiple segments of the first curves.

In the foregoing embodiments, description is provided by using an example in which the method for reconstructing a motion track according to an embodiment of the disclosure is performed by the terminal 103. The method for reconstructing a motion track according to an embodiment of the disclosure may further be performed by the server 101, and the difference from the foregoing embodiments is that the entity that executes the method for reconstructing a motion track is changed from the terminal 103 to the server 101. The method for reconstructing a motion track according to an embodiment of the disclosure may further be jointly performed by the server 101 and the terminal 103, e.g., one or two of the operations (such as operation S202) are performed by the terminal 103, and the remaining operations (such as operation S204 and operation S206) are performed by the server 101. The method for reconstructing a motion track in an embodiment of the disclosure performed by the terminal 103 may alternatively be performed by the client (such as the client of a map application or the client of an application with a built-in map service) installed on the terminal 103.

Through the foregoing operation S202 to operation S206, noise filtering is performed on the positioning data in the data set before the track reconstruction. Data fitting is performed, based on the positioning data obtained after noise filtering, on the plurality of pieces of positioning data acquired at adjacent times, to obtain the plurality of first curves, and the motion track of the target object may be determined based on the first curves. The filtered data that is less disturbed by noise is used in a process of the track reconstruction, so that the reconstructed motion track may be closer to an original motion track, and the technical problem of relatively low accuracy of vehicle motion track reconstruction in the related art may be solved, thereby achieving the technical effect of accurately reconstructing the vehicle motion track.

In the technical solutions of the disclosure, a segmented Euler transition curve (that is, the first curve) may be obtained by using a filtering solution such as the Kalman filtering, to adaptively restore a travelling track line (that is, the motion track) and effectively reconstruct a complex straight geometrical locus, a curve turning geometrical locus and a driving geometrical locus connecting two states under urban road conditions. The solutions of the disclosure may greatly reduce impact of the GPS noise and the data loss on the track reconstruction. The GPS noise herein is mainly GPS positioning information obtained by positioning at locations (such as a garage, a densely built-up area of a city, an underpass and the like) with weak GPS signals, and the data loss is caused by failure in obtaining GPS positioning information in places where GPS signals are weak or non-existent (for example, when passing through a plurality of caves in sequence, the GPS positioning information cannot be acquired in the caves, and only a small amount of the GPS positioning information can be acquired between the caves). In the related art technologies, relatively large errors may exist in the reconstructed track when there is GPS noise data, and in a case of lacking the GPS information, a travelling track cannot be restored due to the relatively small amount of the positioning data. However, the technical solutions of the disclosure may be implemented to reconstruct the travelling track even in a case where the positioning signals such as GPS signals and the like are relatively weak or missing. For example, the positioning data that is the noise data is filtered out when there is a relatively large amount of noise data, and only the positioning data that is relatively accurate is used for track reconstruction. Due to a relatively small amount of the positioning data used in the segmented reconstruction of the disclosure, a small amount of GPS positioning data and inertial guidance data (the position of the vehicle after entering a cave may be deducted from the GPS positioning data before entering the cave and the acceleration measured by a inertial guidance unit of the vehicle) may be used for implementing the track reconstruction in a case of no GPS signals being acquired in a location such as a cave. Therefore, the problem of track reconstruction in the related art when GPS and other positioning signals are relatively weak or missing is solved. The error between the reconstructed track line and the actual travelling data may reach a desired level and/or industrial-level quality, the data may be adaptively segmented and the volume of data to be processed may be effectively reduced. The technical solutions of the disclosure are further described below in detail with reference to operations shown in FIG. 2.

In the technical solution provided in operation S202, the terminal obtains the data set, the data set including positioning data obtained by positioning a target object that is movable (e.g., in a moving process of the target object).

In an optional embodiment, elements in the foregoing data set may be one or more of GPS positioning data, inertial navigation inertial measurement unit (IMU) data (such as a triaxial acceleration, a triaxial angular velocity and the like) and wheel encoder information (such as a measured wheel speed), and may further be travelling track point data calculated according to at least one of GPS, inertial navigation IMU and wheel encoder information.

In the technical solution provided in operation S204, the terminal obtains the plurality of segments of first curves by performing data fitting on a part of the positioning data in the data set. The first curves are obtained by fitting a plurality of pieces of positioning data acquired at adjacent times, and the proportion of noise data in another part of the positioning data of the data set is higher than the proportion of noise data in the part of the positioning data of the data set.

In the foregoing embodiments, obtaining the plurality of first curves by performing data fitting on a part of the positioning data in the data set mainly includes the following operation 1 and operation 2:

Operation 1. Perform data fitting on a part of the positioning data in the data set according to a quantity of segments indicated by a first parameter, to obtain a plurality of segments of second curves, the first parameter indicating a quantity of segments of the plurality of segments of second curves.

The second curve and the first curve may be Euler curves, and the Euler curve is a parameter curve whose curvature varies linearly with the length of the curve. The Euler curve may be expressed as follows, where b is a curvature at a start point (x0, y0), a is a slope of the linear variation of the curvature, and (vx, vy) is a unit direction vector at the start point:

$$x(s)=x0+\int \cos(a \times s \times s + b \times s + vx)ds,$$

$$y(s)=y0+\int \cos(a \times s \times s + b \times s + vy)ds,$$

curvature variation K=a×S+b.

A random geometric model, that is, the segmented Euler curve, is used in a fitting solution. The quantity of segmented curves, the start point (x0, y0), the parameters a and b, and the unit vector (vx, vy) may be random variables. The total fitting error is minimized by optimizing the random variables. S represents the position of a curvature to be determined in a curve or a track, and ds represents an integral of the curve or the track.

Optionally, performing data fitting on a part of the positioning data in the data set according to the first parameter to obtain the plurality of segments of second curves may include: (i) filtering the positioning data that is the noise data (e.g., another part of the positioning data) in the data set to obtain the target data (e.g., the part of the positioning data), where a distance between the motion track and a locating point represented by the positioning data that is the noise data is greater than a distance between the motion track and a locating point represented by positioning data that is not the noise data; in other words, the noise data is data that deviates far away; and (ii) performing fitting on the target data according to the quantity of segments indicated by the first parameter to obtain the plurality of segments of second curves, the quantity of segments of the second curves being the quantity of segments indicated by the first parameter.

If the Kalman filter is used for achieving filtering, a state variable $\hat{X}_{k/(k-1)}$ at time k may be predicted based on an optimal estimation $X_{(k-1)}$ (for example, positioning data at time k−1) at time (k−1), thereby an optimal state estimation $X_k$ (that is, positioning data at ideal time k) at time k may be determined based on the optimal estimation and the state variable at time (k−1), and the system state may be observed at the same time to obtain an observation variable $Z_k$ (that is, actual positioning data at time k), and an analysis is performed based on the prediction and observation. For example, comparing whether a difference between the two (that is, results of prediction and observation) reaches a certain threshold to determine whether an observation variable is the noise. If the difference reaches or exceeds the certain threshold, the observation variable is determined as the noise, otherwise the observation variable is not determined as the noise.

In an optional embodiment, a variance between a certain positioning data and adjacent positioning data may be calculated, and the sum of variances with all the adjacent positioning data may be calculated. When a ratio between the sum value and all the adjacent positioning data is greater than a certain threshold, the positioning data is considered to be the noise data (that is, another part of the positioning data), otherwise the positioning data is not considered to be the noise data (that is, a part of the positioning data).

Optionally, it may be confirmed, in the following manner, whether the plurality of segments of second curves meet the target condition: determining, according to a data fitting parameter, a second parameter, a third parameter, and a fourth parameter of the plurality of segments of second curves, whether the plurality of segments of second curves meet the target condition, where the second parameter is a quantity of angles between two adjacent second curves exceeding a first threshold, the third parameter is a quantity of curvatures between the adjacent second curves exceeding a second threshold, and the fourth parameter is a quantity of segments of the second curves whose length exceeds a third threshold. The first threshold, the second threshold and the third threshold are predetermined values, which may be specifically set in an implementation. For example, the first threshold is 90 degrees, the second threshold is 3 and the third threshold is 5.

The data fitting parameter may further be referred to as goodness of fit, which is a degree of fitting between a regression line (that is, a curve obtained by fitting) and the observation value (that is, the positioning data). The goodness of fit may be represented by using a determination coefficient (also referred to as a coefficient of determination) $R^2$, and a maximum value of $R^2$ is 1. The closer the value of $R^2$ is to 1, the better the degree of fitting between a regression line and the observation value. Otherwise, the smaller the value of $R^2$, the worse the degree of fitting between a regression line and the observation value is. The degree of fitting between a model and a sample observation value may be tested by using the determination coefficient and a regression standard deviation.

In an optional implementation, determining, according to a data fitting parameter, a second parameter, a third parameter, and a fourth parameter of the plurality of segments of second curves, whether the plurality of segments of second curves meet the target condition may include operation 11 to operation 13:

Operation 11. Obtain a first product between the data fitting parameter (or referred to as a data fitting degree data_fitting) of the plurality of segments of second curves and a first weight α, a second product between the second parameter #angle_diff and a second weight β, a third product between the third parameter #curvagture_diff and a third weight γ, and a fourth product between the fourth parameter (or referred to as the quantity of the curves whose lengths exceed the allowed maximum length) and a fourth weight ε, where a sum of the first weight, the second weight, the third weight and the fourth weight is 1.

Operation 12. In a case that a fifth parameter is greater than the fourth threshold, determine that the plurality of segments of second curves do not meet the target condition, where the fifth parameter is a sum of the first product, the second product, the third product and the fourth product. The fourth threshold may be an empirical value or data obtained from experiments, and may be a value that is preset in an implementation, such as 10.

Operation 13. In a case that the fifth parameter is not greater than the fourth threshold, determine that the plurality of segments of second curves meet the target condition.

In another optional embodiment, in a process of determining, according to a data fitting parameter, the second parameter, the third parameter, and the fourth parameter of the plurality of segments of second curves, whether the plurality of segments of second curves meet the target condition, optimization may be performed according to solutions shown in operation 14 and operation 15:

Operation 14. In a case that the fifth parameter is greater than the fourth threshold (that is, not meeting the target condition), perform an adjustment operation on the plurality of segments of second curves, where the adjustment operation includes at least one of the following: adjusting a unit direction vector of an initial position of the second curve in a first range (which is equivalent to adjusting the angle between the adjacent curves), adjusting the data fitting parameter between the second curve and the positioning data covered by the second curve in a second range, and adjusting a curvature between the adjacent second curves in a third range, the first range being a value range set for the unit direction vector, the second range being a value range set for the data fitting parameter, and the third range being a value range set for a target curvature. Optionally, when the adjustment operation is performed, one of the foregoing adjustments may be performed randomly or several adjustments or even all of the adjustments may be performed.

Optionally, adjusting a target curvature between the adjacent second curves in the third range may include: adjusting the value of a first variable a and a second variable b according to the third range; using the sum of a fifth product and the second variable as a value K of the target curvature, and the fifth product is a product between the first variable a and a sixth parameter s (used for representing a position of a curvature to be determined in the curve).

Operation 15. Obtain the fifth parameter of the plurality of segments of second curves after the adjustment operation is performed, and determine, by using the fifth parameter, whether the plurality of segments of second curves meet the target condition. For details, reference may be made to the foregoing operation 11 to operation 13.

In a case that a plurality of adjustments are performed in operation 14, if continued adjustment may cause a corresponding value range to be exceeded, a value of the first parameter is adjusted, and operation 11 to operation 15 are performed again until an optimal segmentation method is found.

Operation 2. Use the plurality of segments of second curves as the plurality of segments of first curves in a case that the plurality of segments of second curves meet the target condition.

Operation 3. In a case that the plurality of segments of second curves do not meet the target condition, adjust a value of the first parameter, and perform data fitting on a part of the positioning data in the data set according to the adjusted value of the first parameter to obtain the plurality of segments of second curves.

In the technical solutions provided by operation S206, the terminal determines the motion track of the target object based on the multiple segments of the first curves.

In the foregoing embodiments, determining the motion track of the target object based on the plurality of segments of first curves may include: obtaining a target angle and the target curvature between the adjacent second curves in a case that the plurality of segments of second curves meet the target condition; and connecting the adjacent second curves according to the target angle and the target curvature between the adjacent second curves to obtain the motion track. In other words, that is, the foregoing optimal segment combination is used as the motion track.

Optionally, the technical solutions of the disclosure may be applied to the field of automatic driving, and the target object may be an autonomous vehicle. After the motion track of the target object is determined based on the plurality of segments of first curves, the technical solutions of the disclosure may be used for adjusting a vehicle travelling manner of the autonomous vehicle by adjusting the travelling manner of the autonomous vehicle according to the motion track and the target track, so that the adjusted autonomous vehicle may travel on the target track, where the target track is a travelling track set for the autonomous vehicle.

Figure 9:
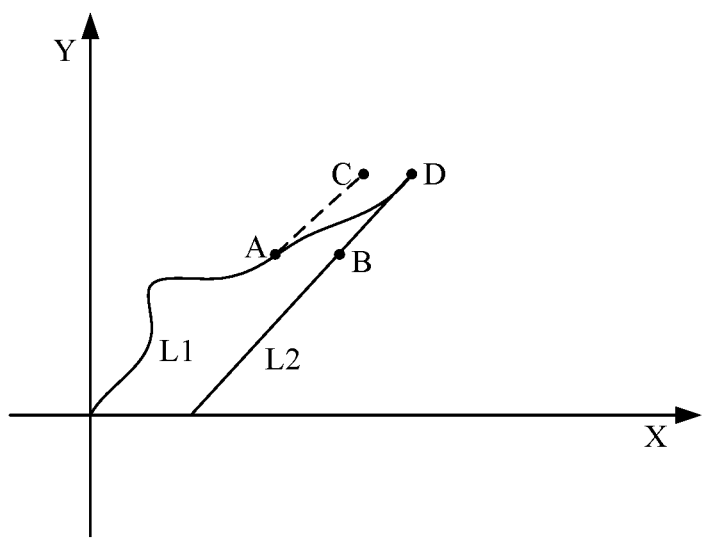
FIG. 9 is a schematic diagram of an optional automatic travelling track adjustment according to an embodiment of the disclosure.

Optionally, referring to FIG. 9, adjusting a travelling manner of the autonomous vehicle according to the motion track and the target track includes the following operation 1 to operation 3:

Operation 1. Obtain a travelling speed v and adjusting time t when the autonomous vehicle travels on the motion track L1. For example, the travelling speed may be a travelling speed at time A, the adjusting time may be set by a user, default by a system, set by a server, and the like.

Operation 2. Determine a first position C and a second position D according to the travelling speed and the adjusting time, where the first position C is a position that the autonomous vehicle travels to according to the travelling speed and the adjusting time on the motion track (that is, the position C that the autonomous vehicle reaches at the travelling speed d for the remaining traveling time t), and the second position D is a position on the target track with the same coordinates as the first position in the first direction Y, which is equivalent to making a line parallel to X, and using a point of intersection of the line and a target track L2 as the second position D.

Operation 3. Determine an acceleration (a) of the autonomous vehicle in a second direction X according to a ratio $2(x_D-x_C)/t^2$ between a value obtained by multiplying twice a coordinate difference $2(x_D-x_C)$ and a square $t^2$ of the adjusting time, where the coordinate difference is a difference value between a coordinate $x_D$ of the second position and a coordinate $x_C$ of the first position in the second direction X, the second direction is different from the first direction, and the vehicle travelling manner of the autonomous vehicle includes the acceleration.

In an optional embodiment, the acceleration (a) may be $2(x_D-x_C)/t^2$, the autonomous vehicle may travel to second position D according to the acceleration (a) and then the effect on the speed in the second direction X caused by the acceleration (a) is zeroed out.

Considering that it takes time to zero out the effect on the speed in the second direction X caused by the acceleration (a), optimization may be performed in the following manner: the acceleration (a) may be $4(x_D-x_C)/t^2$. The autonomous vehicle is controlled to travel for t/2 according to the acceleration (a) first, and then travel for t/2 according to an acceleration (−a), so that the speed in the second direction is not generated due to the acceleration (a) when the autonomous vehicle reaches the second position D. That is, the autonomous vehicle may change from the original travelling track AC to AD from a point A (a point B has the same Y axis coordinate as the point A), and finally the travelling track of the autonomous vehicle intersects with the planned travelling track at the second position D.

In an optional embodiment, the technical solutions of the disclosure are described in detail below by using an example in which the technical solutions of the disclosure are applied to vehicle travelling track (that is, the motion track) reconstruction.

A mapping vehicle for a common navigation application is equipped with an in-vehicle differential GPS receiver, an inertial navigation module and a wheel encoder to record the vehicle position and driving information in a vehicle mapping operation. Generally, for a mapping vehicle with high precision, a GPS base station may further be erected near the mapping road, and some auxiliary positioning services may further be used for improving the positioning precision. According to the vehicle position, the driving information and the auxiliary positioning information, a position of the vehicle in the mapping process may be restored to some discrete vehicle track points.

According to the discrete vehicle track points, which are often polluted by GPS observation noise, the Kalman filtering is used for modeling a state space equation to the vehicle travelling track, and the impact of the noise is reduced by constraints of a motion equation. Then, the observation noise is further reduced by using the curve fitting under a principle of least square and constraints of a curve geometric such as continuity and smoothness, and the track line of the vehicle is reconstructed.

The curve for fitting may be a combined curve of a straight line and a circle, or a third order Bessel segmented curve and a third order B-spline curve. A fitting method or an iterative trying method is used, that is, data points are fitted, one by one, by using fitting elements of different parameters, and the fitting error under a sense of the least square is investigated. The fitting result is obtained after a fitting error or a quantity of iterative operations is reached. Another fitting method is to use all data points as observation points, calculate the least square error between the corresponding points on the fitting curve and the observation points, and obtain the fitting curve under the least square error by adjusting the parameter of the fitting curve as the fitting result.

It may be seen that in the related art, the travelling track point is calculated according to GPS, inertial navigation IMU and wheel encoder information, the GPS observation error is first reduced by the Kalman filtering, and the least square method is used for fitting and reconstructing the travelling track line. The fitting curve may be a segmented curve of a combination of a circle and a straight line, a third order Bessel segmented curve or a third order B-spline curve. Due to the complex road conditions and short and variable road geometry in an urban environment, sudden turning due to space constraints is very common, and requirements for flexibility of the fitting curve are high, causing a relatively large quantity of segments of the fitting curve or a relatively large quantity of control points on the curve to be processed, resulting in a relatively large amount of data to be processed. In addition, it is often difficult for the least square fitting algorithm to ensure the reliability and precision due to more shading, weaker GPS signal strength, more noise and loss of the vehicle track points of urban roads.

There are problems in three aspects in the related art. First, the fitting algorithm uses all the data as fitting data, leading to introduction of noise, and the problem of data loss due to the urban environment and poor quality of the GPS signal is not considered. Consequently, the reliability and precision of the fitting result are relatively low. Second, the urban road environment is complex. Affected by the surrounding buildings, vegetation, terrain and special artificial factors, the road geometry consistency is relatively poor and the sudden turning and variation are sharp. Consequently, the common fitting curve has a relatively large quantity of segments and a large amount of data, and the quality of fitting is not fixed, the flat part may be of relatively good quality but the sharp mutation part is of relatively poor quality, and the fitting error performance is not fixed. Third, the least square fitting algorithm may only ensure that mathematical expectation of the fitting error is relatively low, but the variance of the fitting error is relatively large, that is, the fitting precision is sacrificed to ensure the stability of fitting.

In the solution of the disclosure, the segmented Euler transition curve assisted by the Kalman filtering is used for adaptively restoring the travelling track, and the problems in the above three aspects are solved effectively. First, the fitting algorithm adaptively selects points in the data to participate in the fitting, and adopts a principle similar to random sampling consistency (RANSAC) to adaptively remove impact of points with relatively large errors on the fitting. Second, an element of fitting is the Euler transition curve with high flexibility, and a straight line and a circle are special cases of the curve. The Euler transition curve may fit complex road geometry without a combination of a relatively large quantity of segmented curves, so that the amount of data after fitting is small. Third, the fitting error is defined by using a Euclidean distance directly projected from the fitting data to the fitting curve and directly corresponds to a final fitting error. A process of fitting optimization directly reduces the fitting error and improves the fitting precision.

This solution is suitable for vehicle track reconstruction in high precision map acquisition in the urban environment and vehicle track modeling in automatic driving in the urban environment. Using this solution to reconstruct the vehicle track may effectively improve the precision and reliability of track reconstruction, thereby improving the quality of data acquired by the high precision map in the urban environment, and further improving the quality of the high precision map. For the vehicle track modeling, a vehicle travelling behavior model may be built more effectively, so that the automatic driving is gentler, more conforms to real conditions, and is more comfortable.

Figure 3:
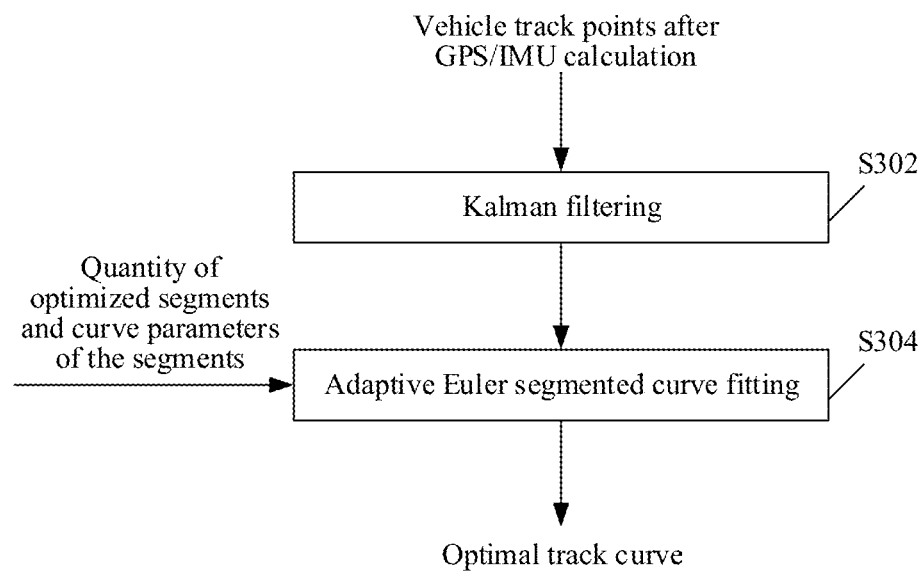
FIG. 3 is a flowchart of an optional method for reconstructing a motion track according to an embodiment of the disclosure.

This solution may include two main operations S302, S304 in FIG. 3.

Figure 4:
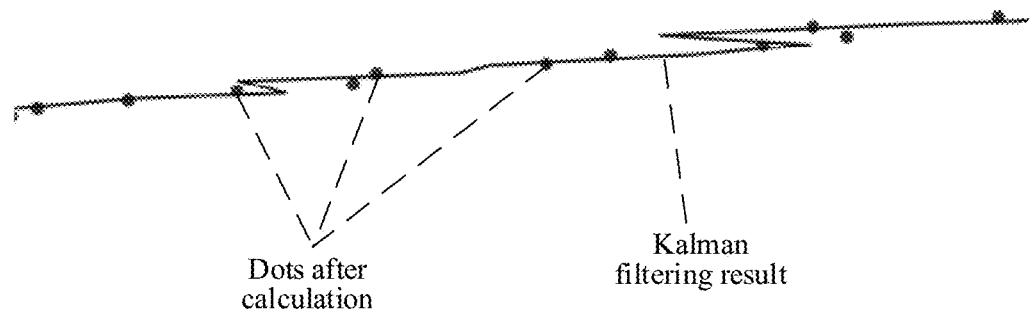
FIG. 4 is a schematic diagram of an optional filtering result according to an embodiment of the disclosure.

Operation S302. Perform Kalman filtering on vehicle track points (that is, in a data set) after GPS/IMU calculation is performed. A filtering result is shown in FIG. 4, where black dots in FIG. 4 are dots after calculation, and the line between dots in FIG. 4 is the Kalman filtering result.

Figure 5:
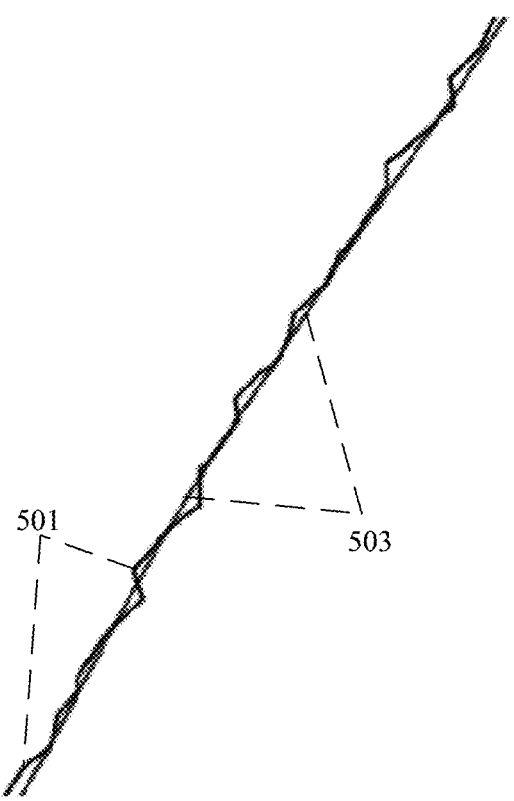
FIG. 5 is a schematic diagram of an optional optimal track curve according to an embodiment of the disclosure.

Operation S304. According to a quantity of optimized segments and curve parameters of the segments, perform adaptive Euler segmented curve fitting, to obtain an optimal track curve. Referring to FIG. 5, a curve 501 in FIG. 5 is the Kalman filtering result, and a curve 503 in FIG. 5 is the curve fitting result.

Figure 6:
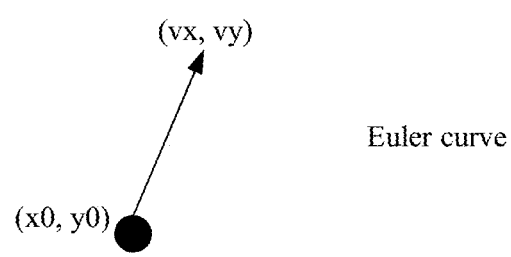
FIG. 6 is a schematic diagram of an optional Euler curve according to an embodiment of the disclosure.

Referring to FIG. 6, the Euler curve is a parameter curve whose curvature varies linearly with the length of the curve, and may be described by using the following formula, where b is a curvature at a start point (x0, y0), a is a slope of the linear variation of the curvature, and (vx, vy) is an unit direction vector at the start point:

$$x(s)=x0+\int \cos(a\times s\times s+b\times s+vx)ds$$

$$y(s)=y0+\int \cos(a\times s\times s+b\times s+vy)ds$$

A random geometric model, that is, the segmented Euler curve, is used in a fitting solution. The quantity of segmented curves, the start point (x0, y0), a and b, and the unit vector (vx, vy) are all random variables. The total fitting error is minimized by optimizing the random variables.

A fitting error cost function is defined as a degree of fitting between each segmented curve and data sample points in a coverage of the segmented curve, and a jump size of a tangent vector between every two adjacent fitting curves, a curvature jump size and whether the curve length is relatively large may be used as factors of the fitting error cost function. The fitting error cost function may be defined by the following formula:

$$E_1=\alpha\times \text{data\_fitting}+\beta\times \text{\#angle\_diff}+\gamma\times \text{\#curvagture\_diff}+\varepsilon\times \text{\#length},$$

where $\alpha$, $\beta$, $\gamma$ and $\varepsilon$ are weight coefficients, data_fitting is the data fitting degree, #angle_diff is a quantity of tangent angle jumps at the joint of the adjacent segmented curves exceeding the maximum allowable angle jump, #curvagture_diff is a quantity of curvature jumps at the joint of the adjacent segmented curves exceeding the maximum allowable curvature jump, and #length is a quantity of curves exceeding the maximum allowable length.

There are a relatively large quantity of parameters that need to be optimized, a quantity of the curves is not fixed and a range of the parameters is large. Therefore, the overall optimization parameter dimension is excessively high. To overcome this problem, the disclosure uses a method of reversible jump Markov chain Monte Carlo (MCMC) (RJMCMC) combined with simulated annealing to achieve the optimal solution.

Figure 7:
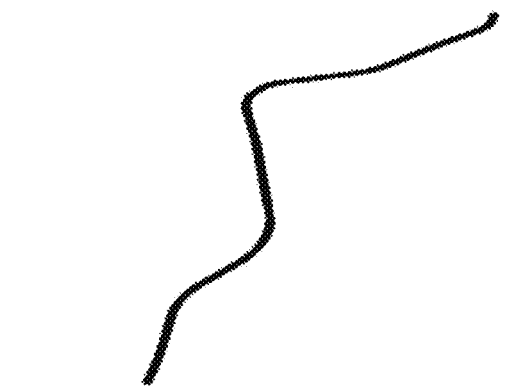
FIG. 7 is a schematic diagram of an optional optimal track curve according to an embodiment of the disclosure.

In an optimization process, a fixed quantity of segments and default curve parameters are set first to perform optimization by constantly changing the combination of the segmented curves. A method for changing the combination of the segmented curves is: selecting segmented curves (or points to participate in the fitting) randomly, merging and breaking the segmented curves, changing positions of connecting points of the adjacent segmented curves, changing a direction vector of a start point of each segmented curve, and changing curvature parameters a and b. During each iteration, segmented curves are selected randomly to calculate whether the fitting error cost function after changing decreases, if the fitting error cost function decreases, the function is accepted; otherwise, the function is accepted or rejected according to a probability. In this manner, after a quantity of iterations, the convergence state is reached. The combination of the segmented curve at the convergence state is the optimal fitting curve (as shown in FIG. 7), that is, the precision and the quantity of the segments are both optimal.

This solution may meet the requirements of industrial-level precision travelling track reconstruction, high precision map acquisition and vehicle track modeling, referring to FIG. 8, and effectively improve the quality of products of automatic driving.

To make the description simple, the foregoing method embodiments are stated as a series of action combinations. However, a person skilled in the art would understand that the disclosure is not limited to the described sequence of the actions because according to the disclosure, some operations may use another sequence or may be simultaneously performed. In addition, it is to be understood by a person skilled in the art that the embodiments described in the specification are merely example embodiments and the related actions and modules are not necessary and omitted.

According to the foregoing descriptions of implementations, a person skilled in the art would understand that the method according to the foregoing embodiments may be implemented by using software and a necessary general hardware platform, or may be implemented by using hardware. However, in some cases, the former may a better implementation. Based on such an understanding, all or at least a part of the technical solutions in the disclosure may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of the disclosure.

Figure 10:
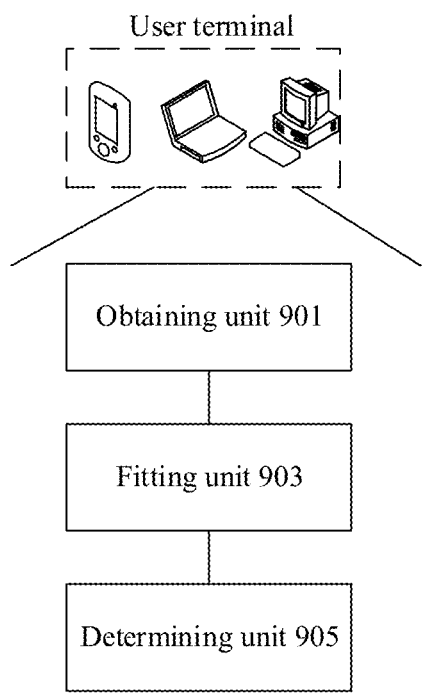
FIG. 10 is a schematic diagram of an optional apparatus for reconstructing a motion track according to an embodiment of the disclosure.

According to another aspect of the embodiments of the disclosure, an apparatus for reconstructing a motion track for implementing the foregoing method for reconstructing a motion track is further provided. FIG. 10 is a schematic diagram of an optional apparatus for reconstructing a motion track according to an embodiment of the disclosure. As shown in FIG. 10, the apparatus may include an obtaining unit 901, a fitting unit 903, and a determining unit 905.

The obtaining unit 901 is configured to obtain a data set, the data set including positioning data obtained by positioning a target object that is movable (e.g., in a moving process of the target object).

The foregoing terminal is an intelligent terminal that follows (or tracks) the target object, and the target object may be a movable object such as a vehicle, a person, an airplane, or the like. For ease of description, the following provides description by using an example in which the target object is a vehicle and the intelligent terminal is an in-vehicle terminal.

The elements stored in the data set are the positioning data, such as positioning data of a GPS and inertial guidance data that are obtained by positioning a vehicle. For example, in a process of driving, a position of the vehicle may be obtained in a certain unit of time (e.g., in a certain time interval such as every other second), that is, positioning data of a plurality of points on a motion track of the vehicle may be acquired without the need to continuously position the vehicle. Accordingly, the energy efficiency of a positioning device is improved and the hardware consumption of the in-vehicle device in the positioning process is reduced.

The fitting unit 903 is configured to perform data fitting on a part of the positioning data in the data set to obtain a plurality of segments of first curves, the first curves being obtained by fitting a plurality of pieces of positioning data acquired at adjacent times, and a proportion of noise data in another part of the positioning data of the data set being higher than that of noise data in the part of the positioning data of the data set.

The determining unit 905 is configured to determine the motion track of the target object based on the plurality of segments of first curves.

The obtaining unit 901 in an embodiment may be configured to perform operation S202 in the embodiments of the disclosure, the fitting unit 903 in an embodiment may be configured to perform operation S204 in the embodiments of the disclosure, and the determining unit 905 in an embodiment may be configured to perform operation S206 in the embodiments of the disclosure.

Optionally, the fitting unit may include: a fitting module, configured to perform data fitting on a part of the positioning data in the data set according to a first parameter to obtain a plurality of segments of second curves, the first parameter being used for indicating a quantity of segments of the plurality of segments of second curves; a first determining module, configured to use the plurality of segments of second curves as the plurality of segments of first curves in a case that the plurality of segments of second curves meet a target condition; and a first adjustment module, configured to: adjust, in a case that the plurality of segments of second curves do not meet the target condition, a value of the first parameter, and perform data fitting on a part of the positioning data in the data set according to the adjusted value of the first parameter to obtain the plurality of segments of second curves.

The foregoing fitting unit is further configured to confirm, in the following manner, whether the plurality of segments of second curves meet the target condition: determining, according to a data fitting parameter, a second parameter, a third parameter, and a fourth parameter of the plurality of segments of second curves, whether the plurality of segments of second curves meet the target condition, where the second parameter is a quantity of angles between two adjacent second curves exceeding a first threshold, the third parameter is a quantity of curvatures between the adjacent second curves exceeding a second threshold, and the fourth parameter is a quantity of segments of the second curves whose length exceeds a third threshold.

Optionally, the fitting unit may include: a first obtaining module, configured to obtain a first product between the data fitting parameter of the plurality of segments of second curves and a first weight, a second product between the second parameter and a second weight, a third product between the third parameter and a third weight and a fourth product between the fourth parameter and a fourth weight, where a sum of the first weight, the second weight, the third weight and the fourth weight is 1; a second determining module, configured to determine, in a case that a fifth parameter is greater than a fourth threshold, that the plurality of segments of second curves do not meet the target condition, where the fifth parameter is a sum of the first product, the second product, the third product and the fourth product; and a third determining module, configured to determine, in a case that the fifth parameter is not greater than the fourth threshold, that the plurality of segments of second curves meet the target condition.

The foregoing fitting unit may include: a second adjustment module, configured to perform, in a case that the fifth parameter is greater than the fourth threshold, an adjustment operation on the plurality of segments of second curves, where the adjustment operations includes at least one of the following: adjusting a unit direction vector of an initial position of the second curve in a first range, adjusting the data fitting parameter between the second curve and the positioning data covered by the second curve in a second range, and adjusting a curvature between the adjacent second curves in a third range, the first range being a value range set for the unit direction vector, the second range being a value range set for the data fitting parameter, and the third range being a value range set for the curvature; and the second adjustment module is configured to obtain the fifth parameter of the plurality of segments of second curves after performing the adjustment operation, and determine, by using the fifth parameter, whether the plurality of segments of second curves meet the target condition.

Optionally, when the second adjustment module adjusts a target curvature between the adjacent second curves in the third range, adjust the value of a first variable and a second variable according to the third range. The sum of a fifth product and the second variable is regarded as the value of the target curvature, and the fifth product is a product between the first variable and a sixth parameter.

When the foregoing fitting module performs data fitting on a part of the positioning data in the data set according to the first parameter to obtain the plurality of segments of second curves, positioning data that is noise data in the data set may be filtered to obtain the target data, where a distance between the motion track and a locating point represented by the positioning data that is the noise data is greater than a distance between the motion track and a locating point represented by positioning data that is not the noise data, and the plurality of segments of second curves are obtained by performing data fitting on the target data.

The foregoing determining unit may further be configured to: obtain a target angle and the target curvature between the adjacent second curves in a case that the plurality of segments of second curves meet the target condition; and connect the adjacent second curves according to the target angle and the target curvature between the adjacent second curves to obtain the motion track.

Examples implemented by the foregoing modules and corresponding operations and application scenarios of the foregoing modules and corresponding operations are the same, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of the disclosure, a server or a terminal for implementing the foregoing method for reconstructing a motion track is further provided.

Figure 11:
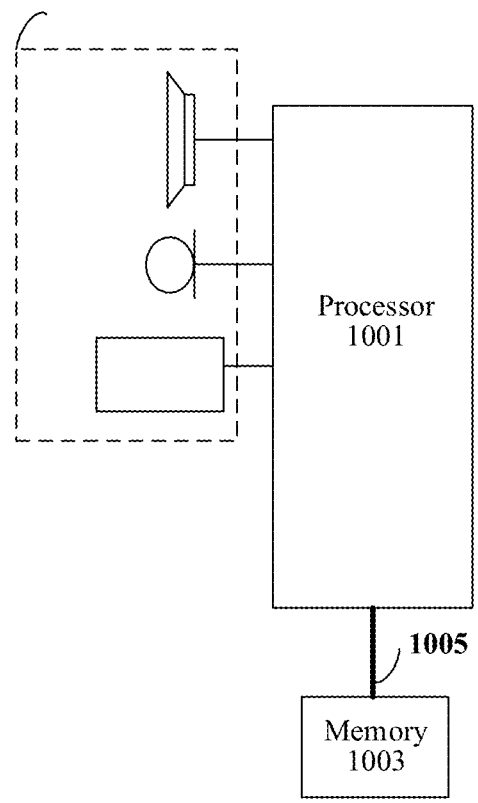
FIG. 11 is a structural block diagram of a terminal according to an embodiment of the disclosure.

FIG. 11 is a structural block diagram of a terminal according to an embodiment of the disclosure. As shown in FIG. 11, the terminal may include: one or more processors 1001 (only one is shown in FIG. 11), a memory 1003, and a transmission apparatus 1005. As shown in FIG. 11, the terminal may further include an input/output device 1007.

The memory 1003 may be configured to store a software program and a module, for example, a program instruction/module corresponding to the method and apparatus for reconstructing a motion track in the embodiments of the disclosure, and the processor 1001 performs various functional applications and data processing by running the software program and the module stored in the memory 1003, thereby implementing the foregoing method for reconstructing a motion track. The memory 1003 may include a high speed random access memory, and may further include a non-volatile memory, for example, one or more magnetic storage apparatuses, a flash memory, or another non-volatile solid-state memory. In some examples, the memory 1003 may further include memories remotely disposed relative to the processor 1001, and the remote memories may be connected to a terminal through a network. Instances of the network include, but are not limited to, the Internet, an intranet, a local area network, a mobile communication network, and a combination thereof.

The transmission apparatus 1005 is configured to receive or send data by means of a network, or may further be configured to transmit data between the processor and the memory. A specific example of the foregoing network may include a wired network and a wireless network. In an example, the transmission apparatus 1005 includes a network interface controller (NIC). The NIC may be connected to another network device and a router by using a network cable, to communicate with the Internet or the local network. In an example, the transmission apparatus 1005 is a radio frequency (RF) module, which communicates with the Internet in a wireless manner.

Specifically, the memory 1003 is configured to store an application program.

The processor 1001 may invoke, by using the transmission apparatus 1005, the application program stored in the memory 1003, to perform the following operations:

obtaining a data set, the data set including positioning data obtained by positioning a target object in a moving process of the target object;

performing data fitting on a part of the positioning data in the data set to obtain plurality of segments of first curves, the first curves being obtained by fitting a plurality of pieces of positioning data acquired at adjacent times, and a proportion of noise data in another part of the positioning data of the data set being higher than that of noise data in the part of the positioning data of the data set; and determining the motion track of the target object based on the plurality of segments of first curves.

The processor 1001 is further configured to perform the following operations:

in a case that a fifth parameter is not greater than a fourth threshold, performing an adjustment operation on the plurality of segments of second curves, where the adjustment operation includes at least one of the following: adjusting a unit direction vector of an initial position of the second curve in a first range, adjusting the fitting parameter between the second curve and the positioning data covered by the second curve in a second range, and adjusting a curvature between the adjacent second curves in a third range, the first range being a value range set for the unit direction vector, the second range being a value range set for the fitting parameter, and the third range being a value range set for the curvature; and obtaining the fifth parameter of the plurality of segments of second curves after the adjustment operation is performed, and determining, by using the fifth parameter, whether the plurality of segments of second curves meet the target condition.

According to an embodiment of the disclosure, a data set is obtained, the data set including positioning data obtained by positioning a target object in a moving process of the target object; data fitting is performed on a part of the positioning data in the data set to obtain a plurality of segments of first curves, the first curves being obtained by fitting a plurality of pieces of positioning data acquired at adjacent times, and a proportion of noise data in another part of the positioning data of the data set being higher than that of noise data in the part of the positioning data of the data set; and a determining unit, configured to determine the motion track of the target object based on the plurality of segments of first curves; and the motion track of the target object is determined based on the plurality of segments of first curves. The filtered data is used in a process of the track reconstruction, and the positioning data used includes no noise data or a small amount of noise data, so that the reconstructed motion track may be closer to an original motion track, and the technical problem of relatively low accuracy of vehicle motion track reconstruction in the related art may be solved, thereby achieving the technical effect of accurately reconstructing the vehicle motion track.

Optionally, for a specific example in an embodiment, reference may be made to the example described in the foregoing embodiment, and details are not described herein again in an embodiment.

A person of ordinary skill in the art may understand that the structure shown in FIG. 11 is merely an example, and the terminal may be a terminal device such as a smart phone (for example, an Android mobile phone or an iOS mobile phone), a tablet computer, a palmtop computer, a mobile Internet device (MID), or a PAD. FIG. 11 does not constitute a limitation on the structure of the foregoing electronic device. For example, the terminal may further include more or fewer components (for example, a network interface and a display apparatus) than those shown in FIG. 11, or have a configuration different from that shown in FIG. 11.

A person of ordinary skill in the art may understand that all or some of the operations of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of the disclosure further provides a storage medium. Optionally, in an embodiment, the foregoing storage medium may be configured to execute program code of a method for reconstructing a motion track.

Optionally, in an embodiment, the storage medium may be located on at least one of a plurality of network devices in the network described in the foregoing embodiment.

Optionally, in an embodiment, the storage medium is configured to store program code for performing the following operations:

S12. Obtain a data set, the data set including positioning data obtained by positioning the target object in a moving process of the target object.

S14. Perform data fitting on a part of the positioning data in the data set to obtain a plurality of segments of first curves, the first curves being obtained by fitting a plurality of pieces of positioning data acquired at adjacent times, and a proportion of noise data in another part of the positioning data of the data set being higher than that of noise data in the part of the positioning data of the data set.

S16. Determine the motion track of the target object based on the plurality of segments of first curves.

Optionally, the storage medium is further configured to store program code for performing the following operations:

S22. In a case that a fifth parameter is not greater than a fourth threshold, perform an adjustment operation on the plurality of segments of second curves, where the adjustment operation includes at least one of the following: adjusting a unit direction vector of an initial position of the second curve in a first range, adjusting the fitting parameter between the second curve and the positioning data covered by the second curve in a second range, and adjusting a curvature between the adjacent second curves in a third range, the first range being a value range set for the unit direction vector, the second range being a value range set for the fitting parameter, and the third range being a value range set for the curvature;

S24. Obtain the fifth parameter of the plurality of segments of second curves after the adjustment operation is performed, and determine, by using the fifth parameter, whether the plurality of segments of second curves meet the target condition.

Optionally, for a specific example in an embodiment, reference may be made to the example described in the foregoing embodiment, and details are not described herein again in an embodiment.

Optionally, in an embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of the disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of operations of the methods in the embodiments of the disclosure.

In the foregoing embodiments of the disclosure, descriptions of the embodiments have different emphases. As for parts that are not described in detail in one embodiment, reference can be made to the relevant descriptions of the other embodiments.

In the several embodiments provided in the disclosure, it is to be understood that the disclosed client can be implemented in other manners. The apparatus embodiments described above are merely exemplary. For example, the division of the units is merely the division of logic functions, and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of the disclosure may be integrated into one processing unit, or each of the units may exist alone physically, or two or more units are integrated into one unit. The foregoing integrated unit may be implemented in the form of hardware, or may be implemented in the form of a software function unit.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

In the embodiments of the disclosure, positioning data including no noise or merely a small amount of noise is obtained by filtering positioning data of the target object in a moving process, and a plurality of pieces of positioning data acquired at adjacent times are fitted based on the filtered data to obtain the plurality of first curves, and the motion track of the target object may be determined based on the first curves. The filtered data that is less disturbed by noise is used in a process of the track reconstruction, so that the reconstructed motion track may be closer to an original motion track, and the technical problem of relatively low accuracy of vehicle motion track reconstruction in the related art may be solved, thereby achieving the technical effect of accurately reconstructing the vehicle motion track.

While the disclosure has been particularly shown and described with reference to example embodiments thereof, it will be understood that various changes in form and details may be made therein without departing from the spirit and scope of the following claims.

What is claimed is:

1. A method for reconstructing a motion track, applied to a terminal that is an in-vehicle terminal or a non in-vehicle terminal that tracks a target object, the method comprising:
   obtaining a data set, the data set including positioning data obtained by positioning the target object;
   performing data fitting on target data in the data set to obtain a plurality of segments of first curves, the target data being positioning data obtained by performing noise filtering on the data set; and
   determining a motion track of the target object based on the plurality of segments of first curves.

2. The method according to claim 1, wherein the performing comprises:
   performing the data fitting on the target data in the data set according to a first parameter to obtain a plurality of segments of second curves, the first parameter indicating a quantity of segments of the plurality of segments of second curves; and based on the plurality of segments of second curves not meeting a target condition, adjusting a value of the first parameter, and performing the data fitting on the target data in the data set according to the adjusted value of the first parameter to obtain the plurality of segments of second curves, and wherein the determining comprises determining, based on the plurality of segments of second curves meeting the target condition, the motion track of the target object based on the plurality of segments of second curves.

3. The method according to claim 2, further comprising determining whether the plurality of segments of second curves meet the target condition according to a data fitting parameter, a second parameter, a third parameter, and a fourth parameter of the plurality of segments of second curves, whether the plurality of segments of second curves meet the target condition, and wherein the second parameter indicates a quantity of angles between two adjacent second curves exceeding a first threshold, the third parameter indicates a quantity of curvatures between the two adjacent second curves exceeding a second threshold, and the fourth parameter indicates a quantity of segments of second curves whose length exceeds a third threshold.

4. The method according to claim 3, wherein the determining whether the plurality of segments of second curves meet the target condition comprises:

obtaining a first product between the data fitting parameter of the plurality of segments of second curves and a first weight, a second product between the second parameter and a second weight, a third product between the third parameter and a third weight and a fourth product between the fourth parameter and a fourth weight, wherein a sum of the first weight, the second weight, the third weight and the fourth weight is 1; and based on a fifth parameter, which is a sum of the first product, the second product, the third product and the fourth product, being not greater than a fourth threshold, determining that the plurality of segments of second curves meet the target condition.

5. The method according to claim 4, wherein the determining whether the plurality of segments of second curves meet the target condition further comprises:

based on the fifth parameter being greater than the fourth threshold, performing an adjustment operation on the plurality of segments of second curves, wherein the adjustment operation comprises at least one of the following: adjusting a unit direction vector of an initial position of a second curve in a first range, adjusting the fitting parameter between the second curve and the positioning data covered by the second curve in a second range, and adjusting a curvature between the two adjacent second curves in a third range, the first range being a value range set for the unit direction vector, the second range being a value range set for the fitting parameter, and the third range being a value range set for the curvature between the two adjacent second curves; and obtaining the fifth parameter of the plurality of segments of second curves after the adjustment operation is performed, and determining, by using the fifth parameter, whether the plurality of segments of second curves meet the target condition.

6. The method according to claim 5, wherein the adjusting the curvature between the two adjacent second curves comprises:

adjusting a value of a first variable and a value of a second variable according to the third range, the first variable and the second variable being used for determining a value of a target curvature between the two adjacent second curves.

7. The method according to claim 1, further comprising:
filtering out positioning data determined as noise data from the data set; and determining remaining positioning data in the data set as the target data.

8. The method according to claim 2, wherein the determining the motion track comprises:

obtaining a target angle and a target curvature between two adjacent second curves based on the plurality of segments of second curves meeting the target condition; and connecting the two adjacent second curves according to the target angle and the target curvature between the two adjacent second curves, to obtain the motion track.

9. The method according to claim 1, wherein the target object comprises an autonomous vehicle, and the method further comprises:

adjusting a travelling manner of the autonomous vehicle according to the motion track and a target track, wherein the target track is a travelling track set for the autonomous vehicle.

10. The method according to claim 9, wherein the adjusting the travelling manner comprises:

obtaining a travelling speed and an adjusting time of the autonomous vehicle during travelling on the motion track;

determining a first position and a second position according to the travelling speed and the adjusting time, wherein the first position is a position to which the autonomous vehicle travels on the motion track according to the travelling speed and the adjusting time, and the second position is a position on the target track with the same coordinate as the first position in a first direction; and determining an acceleration of the autonomous vehicle in a second direction according to a ratio of twice a coordinate difference to a square of the adjusting time, wherein the coordinate difference is between the second position and the first position in the second direction, the second direction is different from the first direction, and the travelling manner of the autonomous vehicle comprises the acceleration.

11. An apparatus for reconstructing a motion track, the apparatus being included in an in-vehicle terminal or a non-vehicle terminal, and the apparatus comprising:

at least one memory configured to store program code; and at least one processor configured to read the program code and operate as instructed by the program code, the program code comprising:

first obtaining code configured to cause at least one of the at least one processor to obtain a data set, the data set including positioning data obtained by positioning a target object that is in a moving process;

fitting code configured to cause at least one of the at least one processor to perform data fitting on target data in the data set to obtain a plurality of segments of first curves, the target data being positioning data obtained by performing noise filtering on the data set; and first determining code configured to cause at least one of the at least one processor to determine a motion track of the target object based on the plurality of segments of first curves.

12. The apparatus according to claim 11, wherein the fitting code comprises:
fitting subcode configured to cause at least one of the at least one processor to perform the data fitting on the target data in the data set according to a first parameter to obtain a plurality of segments of second curves, the first parameter indicating a quantity of segments of the plurality of segments of second curves; and
adjustment subcode configured to cause at least one of the at least one processor to, based on the plurality of segments of second curves not meeting a target condition, adjust a value of the first parameter, and perform the data fitting on the target data in the data set according to the adjusted value of the first parameter to obtain the plurality of segments of second curves, and
wherein the determining code is further configured to cause at least one of the at least one processor to determining, based on the plurality of segments of second curves meeting the target condition, the motion track of the target object based on the plurality of segments of second curves.

13. The apparatus according to claim 12, wherein the fitting code is further configured to cause at least one of the at least one processor to determine whether the plurality of segments of second curves meet the target condition according to a data fitting parameter, a second parameter, a third parameter, and a fourth parameter of the plurality of segments of second curves, whether the plurality of segments of second curves meet the target condition, and
wherein the second parameter indicates a quantity of angles between two adjacent second curves exceeding a first threshold, the third parameter indicates a quantity of curvatures between the two adjacent second curves exceeding a second threshold, and the fourth parameter indicates a quantity of segments of second curves whose length exceeds a third threshold.

14. The apparatus according to claim 13, wherein the fitting code is further configured to cause at least one of the at least one processor to determine whether the plurality of segments of second curves meet the target condition by performing:
obtaining a first product between the data fitting parameter of the plurality of segments of second curves and a first weight, a second product between the second parameter and a second weight, a third product between the third parameter and a third weight and a fourth product between the fourth parameter and a fourth weight, wherein a sum of the first weight, the second weight, the third weight and the fourth weight is 1; and
based on a fifth parameter, which is a sum of the first product, the second product, the third product and the fourth product, being not greater than a fourth threshold, determining that the plurality of segments of second curves meet the target condition.

15. The apparatus according to claim 14, wherein the fitting code is further configured to cause at least one of the at least one processor to:
based on the fifth parameter being greater than the fourth threshold, perform an adjustment operation on the plurality of segments of second curves, wherein the adjustment operation comprises at least one of the following: adjusting a unit direction vector of an initial position of a second curve in a first range, adjusting the fitting parameter between the second curve and the positioning data covered by the second curve in a second range, and adjusting a curvature between the two adjacent second curves in a third range, the first range being a value range set for the unit direction vector, the second range being a value range set for the fitting parameter, and the third range being a value range set for the curvature between the two adjacent second curves; and
obtain the fifth parameter of the plurality of segments of second curves after the adjustment operation is performed, and determining, by using the fifth parameter, whether the plurality of segments of second curves meet the target condition.

16. The apparatus according to claim 11, wherein the program code further comprises target data obtaining code configured to cause at least one of the at least one processor to filter out positioning data determined as noise data from the data set and determine remaining positioning data in the data set as the target data.

17. The apparatus according to claim 12, wherein the determining code is further configured to cause at least one of the at least one processor to obtain a target angle and a target curvature between two adjacent second curves based on the plurality of segments of second curves meeting the target condition, and connect the two adjacent second curves according to the target angle and the target curvature between the two adjacent second curves, to obtain the motion track.

18. The apparatus according to claim 11, wherein the target object comprises an autonomous vehicle, and the program code further comprises:
second obtaining code configured to cause at least one of the at least one processor to obtain a travelling speed and an adjusting time of the autonomous vehicle during travelling on the motion track;
second determining code configured to cause at least one of the at least one processor to determine a first position and a second position according to the travelling speed and the adjusting time, wherein the first position is a position to which the autonomous vehicle travels on the motion track according to the travelling speed and the adjusting time, and the second position is a position on a target track with the same coordinate as the first position in a first direction, wherein the target track is a travelling track set for the autonomous vehicle; and
third determining code configured to cause at least one of the at least one processor to determine an acceleration of the autonomous vehicle in a second direction according to a ratio of twice a coordinate difference to a square of the adjusting time, wherein the coordinate difference is between the second position and the first position in the second direction, the second direction is different from the first direction.

19. A non-transitory computer-readable storage medium included in an apparatus for reconstructing a motion track, the apparatus being included in an in-vehicle terminal or a non-vehicle terminal, wherein the storage medium comprises a computer program stored therein, the computer program, when executed by at least one processor, causing the at least one processor to perform:
obtaining a data set, the data set including positioning data obtained by positioning a target object;
performing data fitting on target data in the data set to obtain a plurality of segments of first curves, the target data being positioning data obtained by performing noise filtering on the data set; and determining a motion track of the target object based on the plurality of segments of first curves.

20. An electronic device, comprising at least one memory, at least one processor, and a computer program that is stored in the at least one memory and executable by the at least one processor to cause at least one of the at least one processor to perform the method of claim 1.

\* \* \* \* \*